US011045991B2

(12) United States Patent
Iuliano et al.

(10) Patent No.: US 11,045,991 B2
(45) Date of Patent: Jun. 29, 2021

(54) DUAL STAGE FLEX LIP FOR AN EXTRUSION DIE

(71) Applicant: NORDSON CORPORATION, Westlake, OH (US)

(72) Inventors: Salvatore G. Iuliano, Eau Claire, WI (US); Chris Bergeman, Chippewa Falls, WI (US); Nathan Rich, Barron, WI (US); Michael Truscott, Chippewa Falls, WI (US)

(73) Assignee: Nordson Corporation, Westlake, OH (US)

( * ) Notice: Subject to any disclaimer, the term of this patent is extended or adjusted under 35 U.S.C. 154(b) by 393 days.

(21) Appl. No.: 15/952,624

(22) Filed: Apr. 13, 2018

(65) Prior Publication Data

US 2019/0315035 A1    Oct. 17, 2019

(51) Int. Cl.
| | |
|---|---|
| *B29C 48/30* | (2019.01) |
| *B29C 48/31* | (2019.01) |
| *B29C 48/08* | (2019.01) |
| *B29C 48/21* | (2019.01) |
| *B29C 48/35* | (2019.01) |
| *B29C 48/305* | (2019.01) |
| *B29L 7/00* | (2006.01) |
| *B29L 9/00* | (2006.01) |

(52) U.S. Cl.
CPC ............. *B29C 48/30* (2019.02); *B29C 48/08* (2019.02); *B29C 48/21* (2019.02); *B29C 48/307* (2019.02); *B29C 48/313* (2019.02); *B29C 48/35* (2019.02); *B29L 2007/002* (2013.01); *B29L 2009/00* (2013.01)

(58) Field of Classification Search
CPC ....... B29C 48/30; B29C 48/35; B29C 48/313; B29C 48/08; B29C 48/21; B29C 48/307; B29C 48/31; B29C 48/301; B29C 48/302; B29C 48/325; B29C 48/2556
USPC ................................................... 264/173.16
See application file for complete search history.

(56) References Cited

U.S. PATENT DOCUMENTS

| | | | |
|---|---|---|---|
| 4,161,385 A | 7/1979 | Goldstein et al. | |
| 4,704,083 A * | 11/1987 | Iguchi | B29C 48/08 425/466 |
| 2009/0035410 A1 | 2/2009 | Mizunuma et al. | |

FOREIGN PATENT DOCUMENTS

JP    60-190324 A    9/1985

OTHER PUBLICATIONS

ISA/220—Notification of Transmittal or Search Report and Written Opinion of the ISA, or the Declaration dated Jul. 22, 2019 for WO Application No. PCT/US19/025559.

* cited by examiner

*Primary Examiner* — Jeffrey M Wollschlager
*Assistant Examiner* — Xue H Liu
(74) *Attorney, Agent, or Firm* — BakerHostetler

(57) ABSTRACT

A die includes an upper body member and an adjustment system. The upper body member has a upper surface, a gap surface, a gap edge positioned between the upper surface and the gap surface, and a gap flange. The adjustment system includes an adjustment body that defines a plurality of channels, and a plurality of adjusters. Each of the plurality of adjusters is slideably positioned within a respective one of the plurality of channels. Each of the plurality of adjusters is configured to couple to the gap flange of the upper body member. When the plurality of adjusters are coupled to the gap flange movement of the plurality of adjusters causes a change in a position of the gap edge.

26 Claims, 12 Drawing Sheets

DUAL STAGE FLEX LIP FOR AN EXTRUSION DIE

TECHNICAL FIELD

The present disclosure relates to extrusion dies, and more particularly, to an extrusion die that adjusts fluid distribution across an extrusion die using a dual stage flex lip.

BACKGROUND

Sheet extrusion dies are used for discharging molten polymer into a roll stack, and can include single-layer or multi-layer dies. A single-layer extrusion die delivers a single layer of molten polymer to a roll stack, whereas a multi-layer extrusion die delivers at least two layers of molten polymer to a roll stack. The molten polymer is forced out of a reservoir through a land gap to a die lip exit by pressure, and this extrudate is fed to the roll stack.

To change the distribution of the molten polymer entering the roll stack, most conventional dies include a flexible lip that can be adjusted through the use of multiple adjustment rods. The flexible lip only profiles the exiting die lip gap, which refines the composite or overall thickness but does not refine the distribution of individual layers. Some conventional dies include internal restrictor bars for control of individual layer distribution. However, the use of restrictor bars limits the number of applications the die can perform. For instance, restrictor bars prevent dies from performing applications that use degradable, thermally sensitive materials, or applications requiring high clarity in the final product.

Therefore, there is a need for an improved extrusion die to solve the above identified limitations.

SUMMARY

Disclosed herein is a multi-layer extrusion die for dispensing molten polymer. The extrusion die includes an adjustment system that provides a streamlined way of fine-tuning, during operation, the distribution of a skin layer of the molten polymer. The adjustment system allows an operator to separately profile the skin layer by adjusting a skin manifold exit gap (e.g. damper gap) by contorting a damper flex. The operator can also adjust the flex lip to refine the overall thickness uniformity of the composite molten polymer structure.

The extrusion die includes an upper body member, a center body member, a lower body member, and an adjustment system. The upper body member has an upper surface, a gap surface, a gap edge positioned between the upper surface and the gap surface, and a gap flange. The center body member has an upper center surface, a lower center surface, and a center edge positioned between the upper center surface and the lower center surface. The center member is positioned adjacent to the upper body member and defines a gap channel between the gap surface and the upper center surface and a gap opening between the gap edge and the center edge. The lower body member has a lower surface that defines a lower edge. The lower body member is positioned adjacent to the upper body member and defines a main channel between the lower surface of the lower body member and the upper surface of the upper member and a main opening between the lower edge of the lower body member and the upper edge of the upper member. The gap opening is positioned between the gap channel and the main channel.

The adjustment system includes an adjustment body that defines a plurality of adjuster channels, and a plurality of gap adjusters. Each of the plurality of gap adjusters is slideably positioned within a respective one of the plurality of adjuster channels. Each of the plurality of gap adjusters is configured to couple to the gap flange of the upper body member. When the plurality of gap adjusters are coupled to the gap flange, movement of the plurality of gap adjusters causes a change in a size of the gap opening.

Another aspect of the present disclosure provides an extrusion die that includes an upper body member and an adjustment system. The upper body member has an upper surface, a gap surface, a gap edge positioned between the upper surface and the gap surface, and a gap flange. The adjustment system includes an adjustment body that defines a plurality of channels, and a plurality of adjusters. Each of the plurality of adjusters is slideably positioned within a respective one of the plurality of channels. Each of the plurality of adjusters is configured to couple to the gap flange of the upper body member. When the plurality of adjusters are coupled to the gap flange movement of the plurality of adjusters causes a change in a position of the gap edge.

Another aspect of the present disclosure provides a method for dispensing fluid through an extrusion die. The extrusion die defines a gap channel, a gap opening, a main channel, a main opening, and a lower channel. The gap opening is positioned between the main channel and the gap channel. The method comprises: providing a first fluid into the main channel through the gap opening via the gap channel; providing a second fluid into the main channel via the lower channel such that the first fluid is combined with the second fluid in the main channel; and adjusting a thickness of the first fluid flowing through the gap opening by adjusting a size of the gap opening.

This summary is provided to introduce a selection of concepts that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein.

DETAILED DESCRIPTION

An extrusion die for transferring a molten polymer to a roll stack (not shown), such as an extruded plastic sheet, is described. Unlike prior dies, the extrusion die described herein includes an adjustment system that includes a flex lip adjustment assembly to refine the overall thickness of the polymer exiting the die, and a gap lip adjustment assembly to refine the thickness of individual layers of the polymer.

Figure 1:
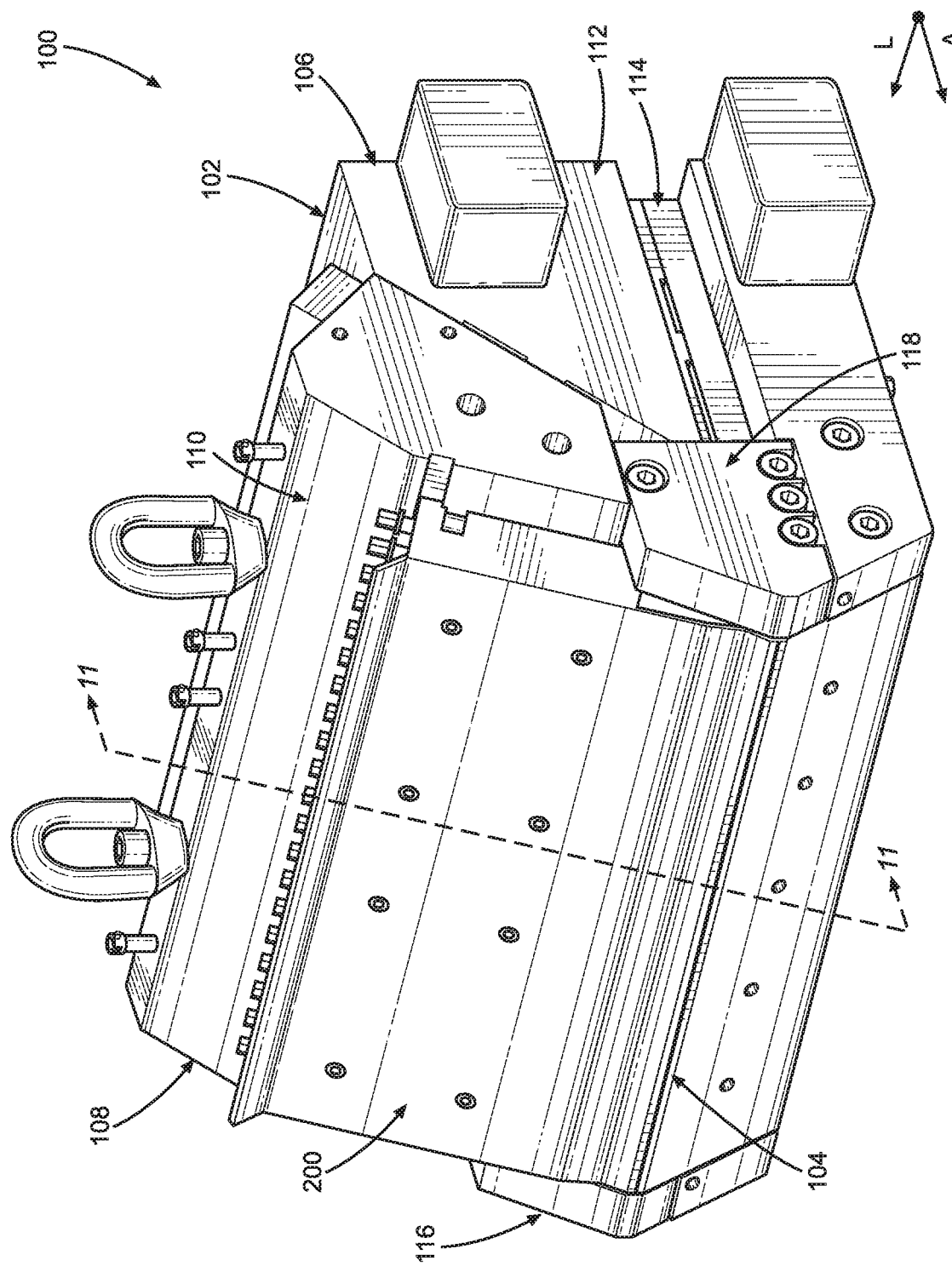
FIG. 1 illustrates a front perspective view of an extrusion die.

FIG. 1 provides a front perspective view of an extrusion die 100. The extrusion die 100 includes a back end 102, a dispensing end 104 spaced from the back end 102 in an axial or flow direction A, a first end 106 (e.g. right side), and a second end 108 (e.g. left side) spaced from the right side 106 in a longitudinal direction L. The dispensing end 104 is configured to discharge a fluid to a roll stack. The fluid may include molten polymer blends and the like. The extrusion die 100 may be supported by a base, floor mount, table top, or other support structure (not shown) to align the extrusion die 100 with the roll stack. In an aspect, the roll stack may be positioned adjacent to the dispensing end 104 during an application of fluid into the roll stack.

Certain terminology is used in the description for convenience only and is not limiting. The words "proximal" and "distal" generally refer to positions or directions toward and away from, respectively, an individual operating a cartridge assembly. The words "axial," "vertical," "transverse," "longitudinal," "left," "right," "upward," "downward," "above," and "below" designate directions in the drawings to which reference is made. The term "substantially" is intended to mean considerable in extent or largely but not necessarily wholly that which is specified. The terminology includes the above-listed words, derivatives thereof and words of similar import.

The extrusion die 100 includes an upper body member 110, a center body member 112, a lower body member 114, a left end plate 116, a right end plate 118, and an adjustment system 200. The extrusion die 100 may also include thermally actuating automatic die lip adjusting bolts, or other components commonly used in extrusion dies. The upper body member 110, the center body member 112, and the lower body member 114 are preferably manufactured from alloy tool steel with the flow surfaces being hard chrome plated. Alternatively, the upper body member 110, the center body member 112, and the lower body member 114 may be manufactured from special alloys or other material having a high dimensional stability. It will be appreciated that the extrusion die 100 may include more body members, such as multiple center body members (e.g., triple layer dies) configured to provide fluid with two or more layers.

Figure 2:
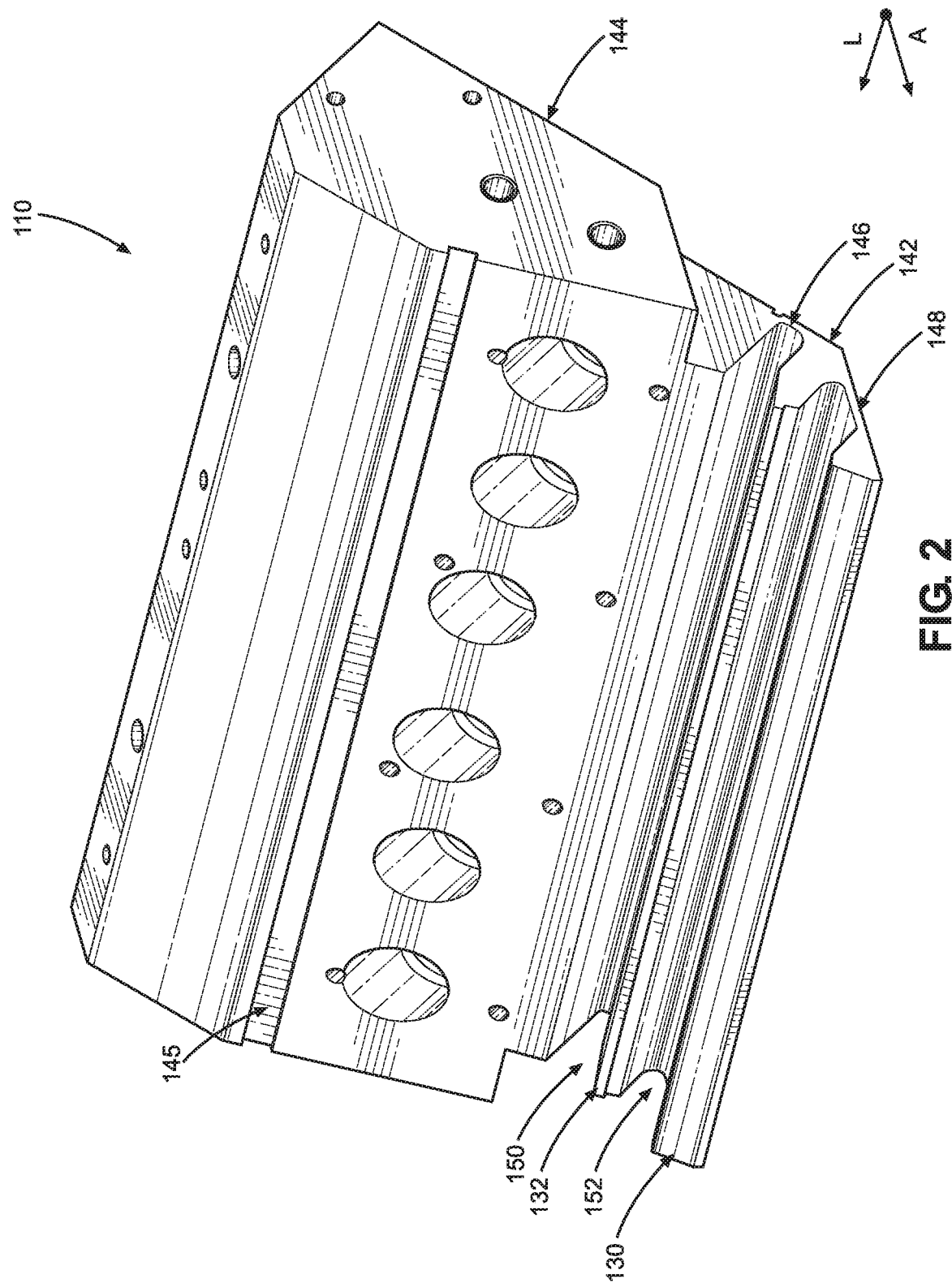
FIG. 2 illustrates a top perspective view of an upper body member of the extrusion die shown in FIG. 1.
Figure 3:
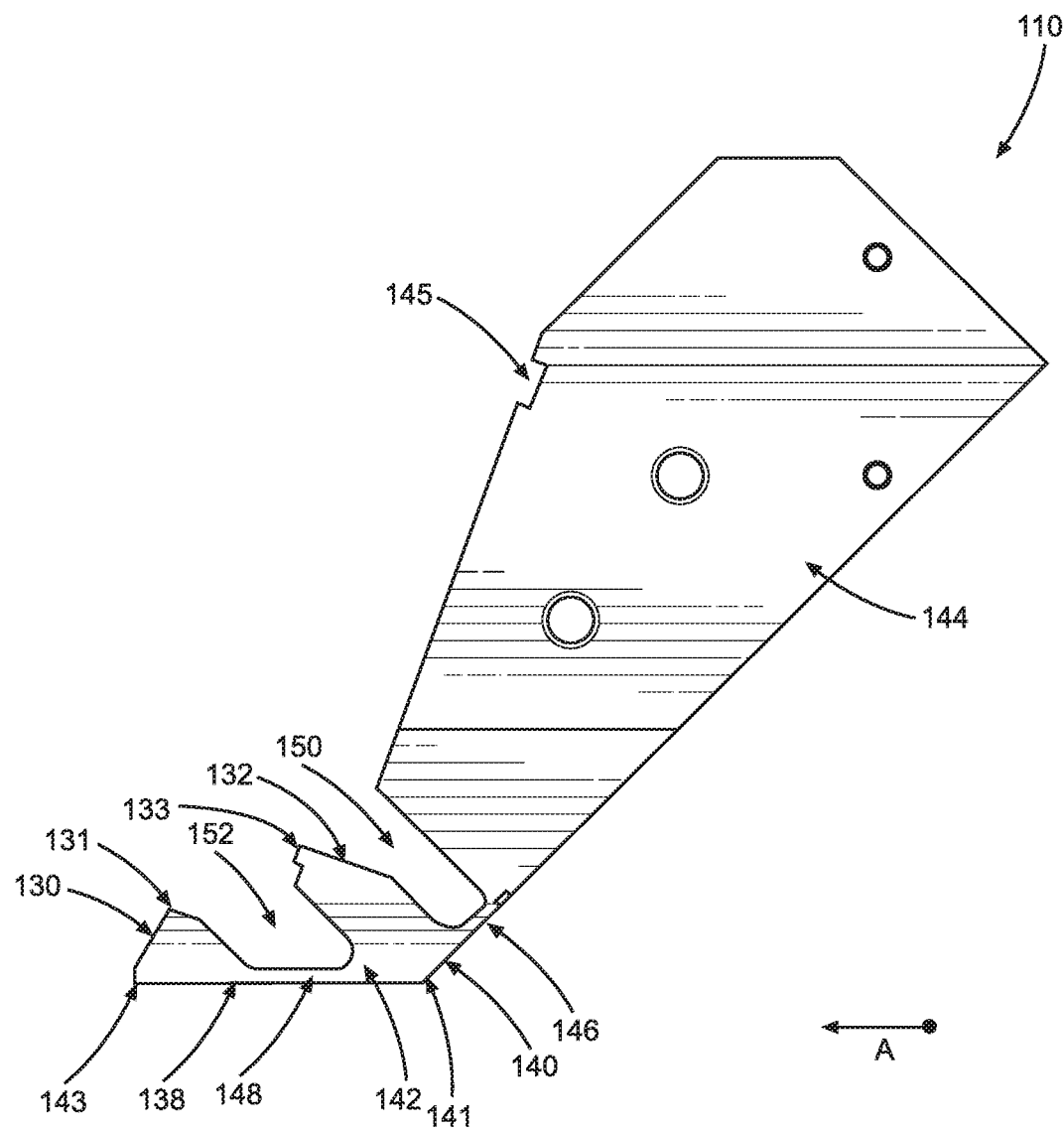
FIG. 3 illustrates a side view of the upper body member shown in FIG. 2.
Figure 4:
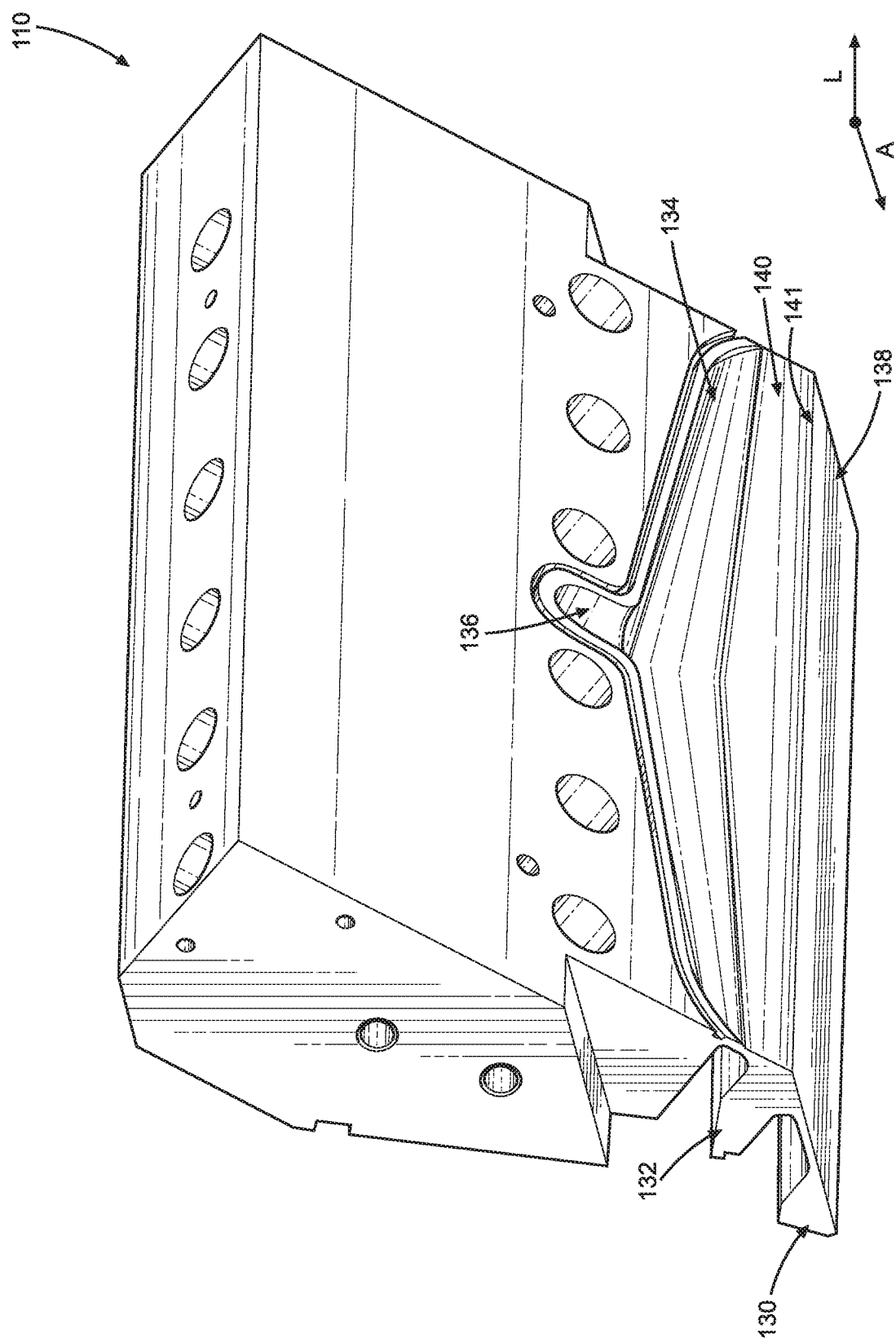
FIG. 4 illustrates a bottom perspective view of the upper body member shown in FIG. 2.

FIGS. 2, 3, and 4 illustrate a top perspective view, a side view, and a bottom perspective view of the upper body member 110, respectively. The upper body member 110 extends in the longitudinal direction L from the first end 106 to the second end 108 of the extrusion die 100. The upper body member 110 includes a lip flange 130, a gap flange 132, an upper entry channel 134, and an upper port channel 136. The upper body member 110 further includes an upper surface 138 (e.g. upper land surface) and a gap surface 140. The lip flange 130, the gap flange 132, the upper surface 138, and the gap surface 140 extend from the first end 106 to the second end 108 of the extrusion die 100 along the upper body member 110 in the longitudinal direction L. In an aspect, the lip flange 130, the gap flange 132, the upper surface 138, and the gap surface 140 extend along an entire length of the upper body member 110 in the longitudinal direction L. The upper port channel 136 extends from a back surface of the upper body member 110 to the upper entry channel 134. The upper entry channel 134 extends from the upper port channel 136 to the gap surface 140. The gap surface 140 extends from the upper entry channel 134 to a gap edge 141. The upper surface 138 extends from the gap edge 141 to an upper lip edge 143.

The lip flange 130 includes a lip surface 131. The lip surface 131 is located on an upper end of the lip flange 130 and extends along the lip flange 130 in the longitudinal direction L. The gap flange 132 includes a notch 133. The notch 133 may be located at an end of the gap flange 132 opposite to an end of the gap flange 132 that connects to a first flex hinge 146 and a second flex hinge 148. The notch 133 extends along the gap flange 132 in the longitudinal direction L.

The upper body member 110 further includes an adjustment portion 142, an attachment portion 144, the first flex hinge 146, and the second flex hinge 148. The attachment portion 144 is connected to the adjustment portion 142 by the first flex hinge 146. The attachment portion 144 defines a recess 145 that extends therethrough in the longitudinal direction. The adjustment portion 142 includes the lip flange 130, the gap flange 132, and the second flex hinge 148. The lip flange 130 is connected to the gap flange 132 by the second flex hinge 148. The lip flange 130 is spaced from the gap flange 132 in the axial direction A. The connection between the attachment portion 144 and the adjustment portion 142 forms a first flex channel 150 defined by the gap flange 132, the first flex hinge 146, and a bottom surface (not labeled) of the attachment portion 144. The lip flange 130, the gap flange 132, and the second flex hinge 148 define a second flex channel 152 therebetween. The first and second flex channels 150 and 152 extend through the upper body member 110 in the longitudinal direction L.

The adjustment portion 142 and the attachment portion 144 are rotatable relative to each other about the first flex hinge 146. Rotation of the adjustment portion 142 relative to the attachment portion 144 increases and decreases a size of the first flex channel 150. The rotation is controlled by the size of the first flex channel 150 and/or by a size (e.g. thickness) of the first flex hinge 146. For example, with reference to FIG. 3, to restrict or prevent the rotation of the adjustment portion 142 about the first flex hinge in an upward direction from exceeding a predetermined threshold (e.g. fracture threshold of the first flex hinge 146), a distance between the gap flange 132 and the lower surface of the attachment portion 144 may be reduced, limiting the upward rotation of the adjustment portion 142.

The lip flange 130 is rotatable relative to the gap flange 132 about the second flex hinge 148. Rotation of the lip flange 130 relative to the gap flange 132 increases and decreases a size of the second flex channel 152. Similar to the first flex hinge 146, the rotation of the lip flange 130 relative to the gap flange 132 is controlled by the size of the second flex channel 152 and/or by a size (e.g. thickness) of the second flex hinge 148.

Figure 5:
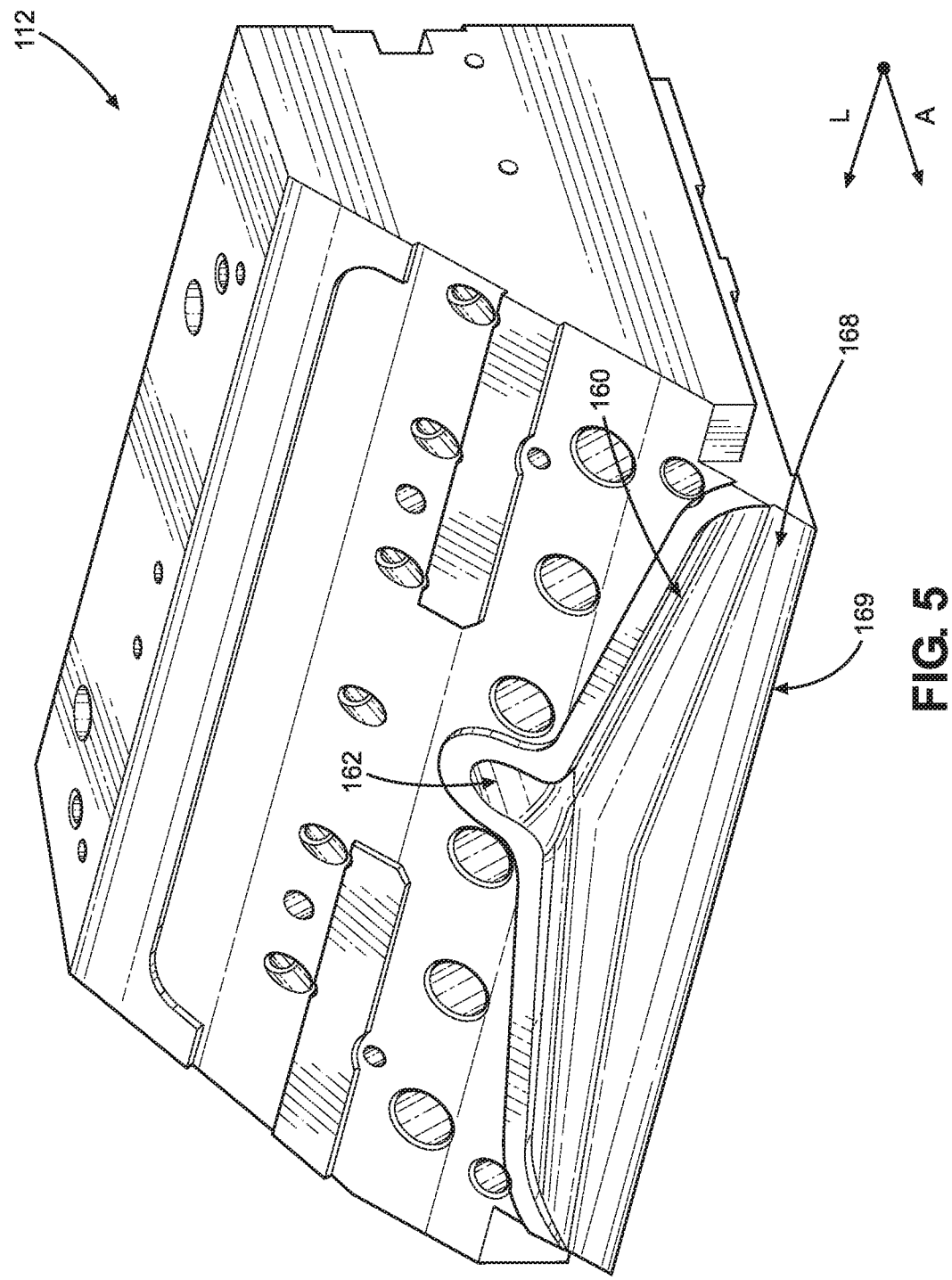
FIG. 5 illustrates a top perspective view of a center body member of the extrusion die shown in FIG. 1.
Figure 6:
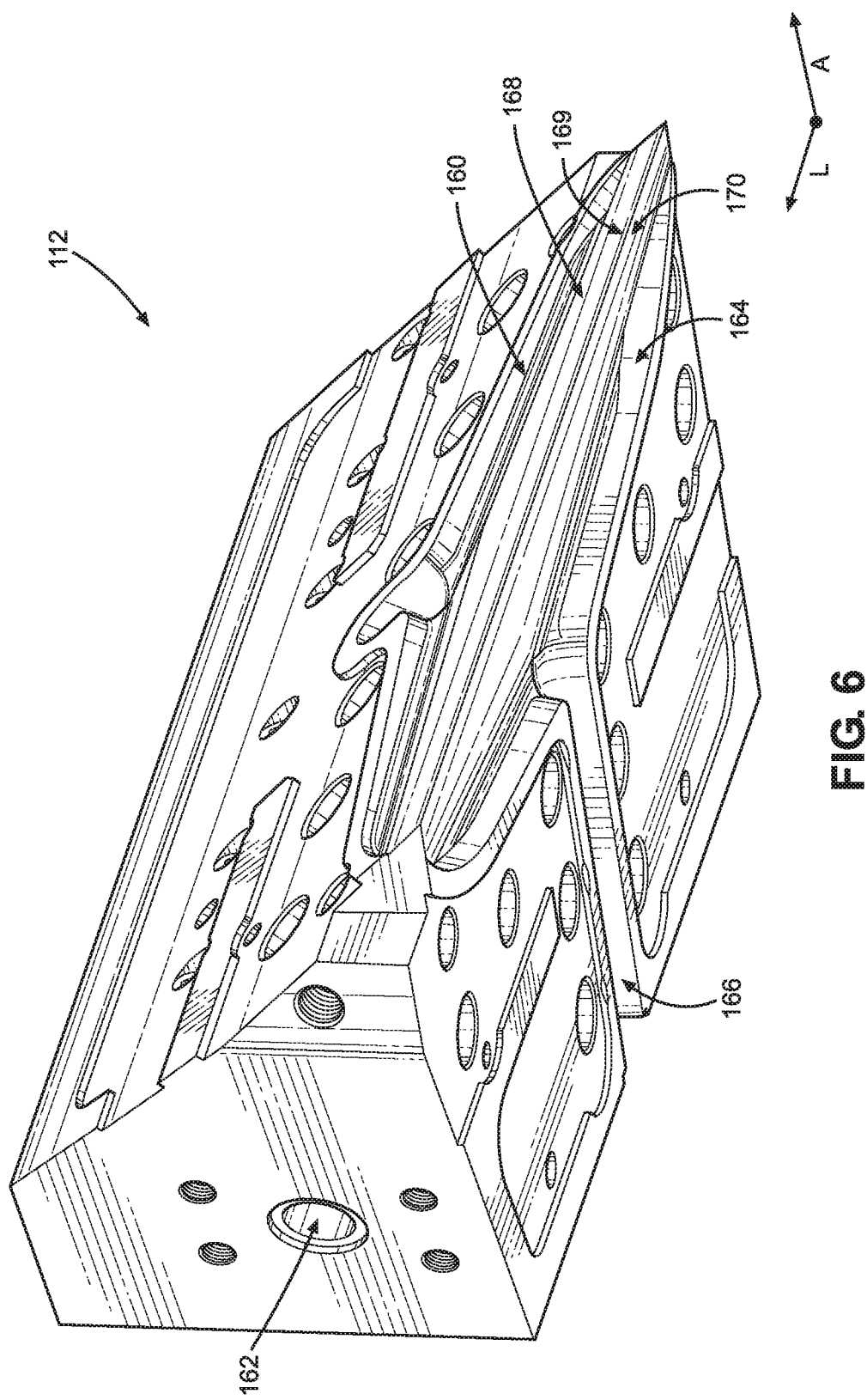
FIG. 6 illustrates a bottom perspective view of the center body member shown in FIG. 5.

FIGS. 5 and 6 illustrate a top perspective view and a bottom perspective view of the center body member 112, respectively. The center body member 112 extends in the longitudinal direction L from the first end 106 to the second end 108 of the extrusion die 100. The center body member 112 includes a first center channel 160, a first center port channel 162, a second center channel 164, and a second center port channel 166. The first center port channel 162 extends from a side surface of the center body member 112 to the first center channel 160. The first center channel 160 extends from the first center port channel 162 to an upper center surface 168. The upper center surface 168 extends from the first center channel 160 to a center edge 169. The second center port channel 166 extends from a back surface of the center body member 112 to the second center channel 164. The second center channel 164 extends from the second center port channel 166 to a lower center surface 170. The lower center surface 170 extends from the second center channel 164 to the center edge 169. The center edge 169 is positioned between the upper center surface 168 and the lower center surface 170. It will be appreciated that the first center port channel 162 and the second center port channel 166 may extend from the same surface or different surfaces of the center body member 112.

Figure 7:
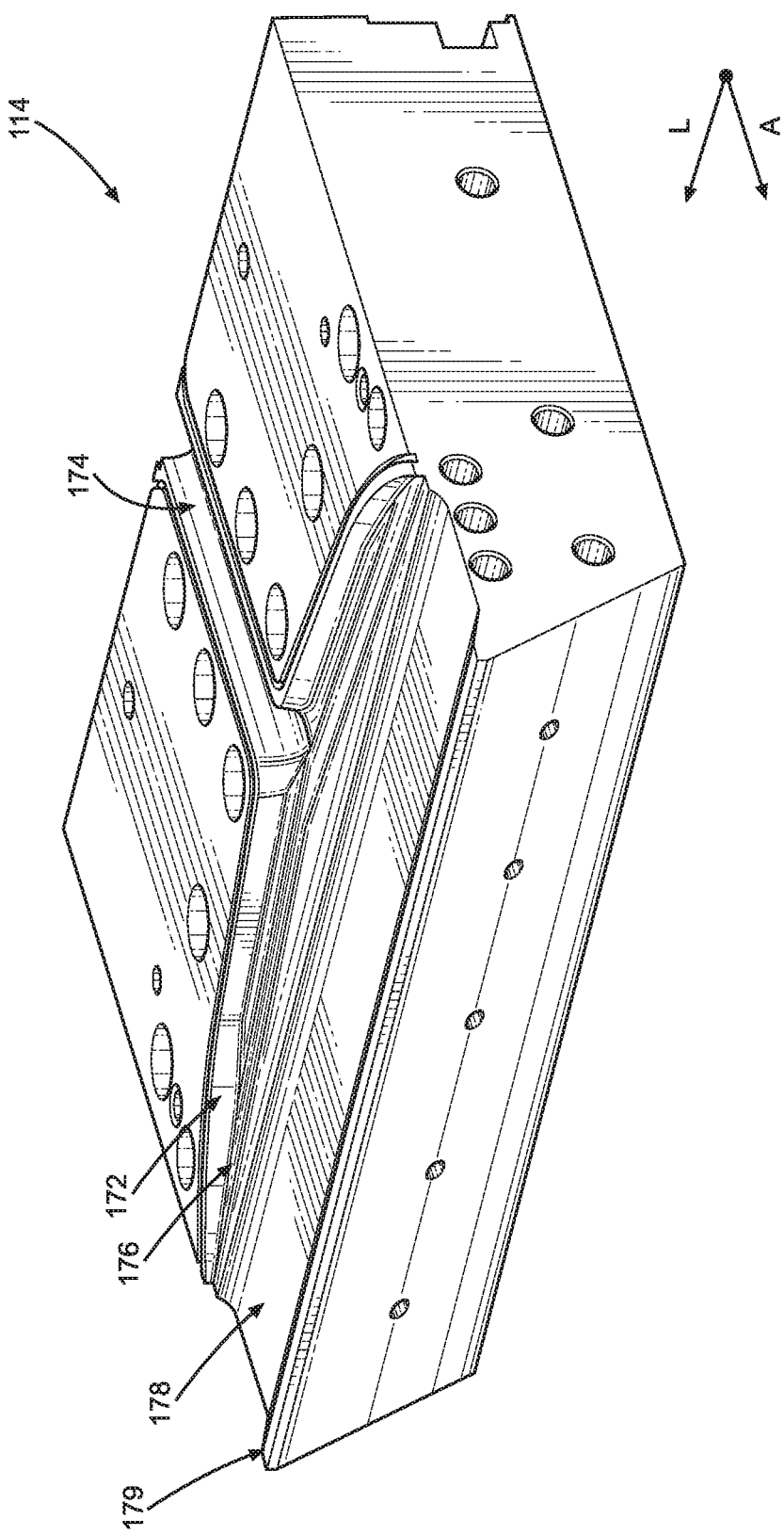
FIG. 7 illustrates a top perspective view of a lower body member of the extrusion die shown in FIG. 1.

FIG. 7 illustrates a perspective view of the lower body member 114. Lower body member 114. The lower body member 114 extends in the longitudinal direction L from the first end 106 to the second end 108 of the extrusion die 100. The lower body member 114 defines a lower entry channel 172 and a lower port channel 174. The lower body member 114 includes a first lower surface 176 and a second lower surface 178 (e.g. lower land surface) adjacent to the first lower surface 176. The lower port channel 174 extends from an outer surface of the lower body member 114 to the lower entry channel 172. The lower entry channel 172 extends from the lower port channel 174 to the first lower surface 176. The second lower surface 178 extends from the first lower surface 176 to a lower lip edge 179. The lower lip edge 179 extends along a front end of the lower body member 114 in the longitudinal direction L.

Figure 8:
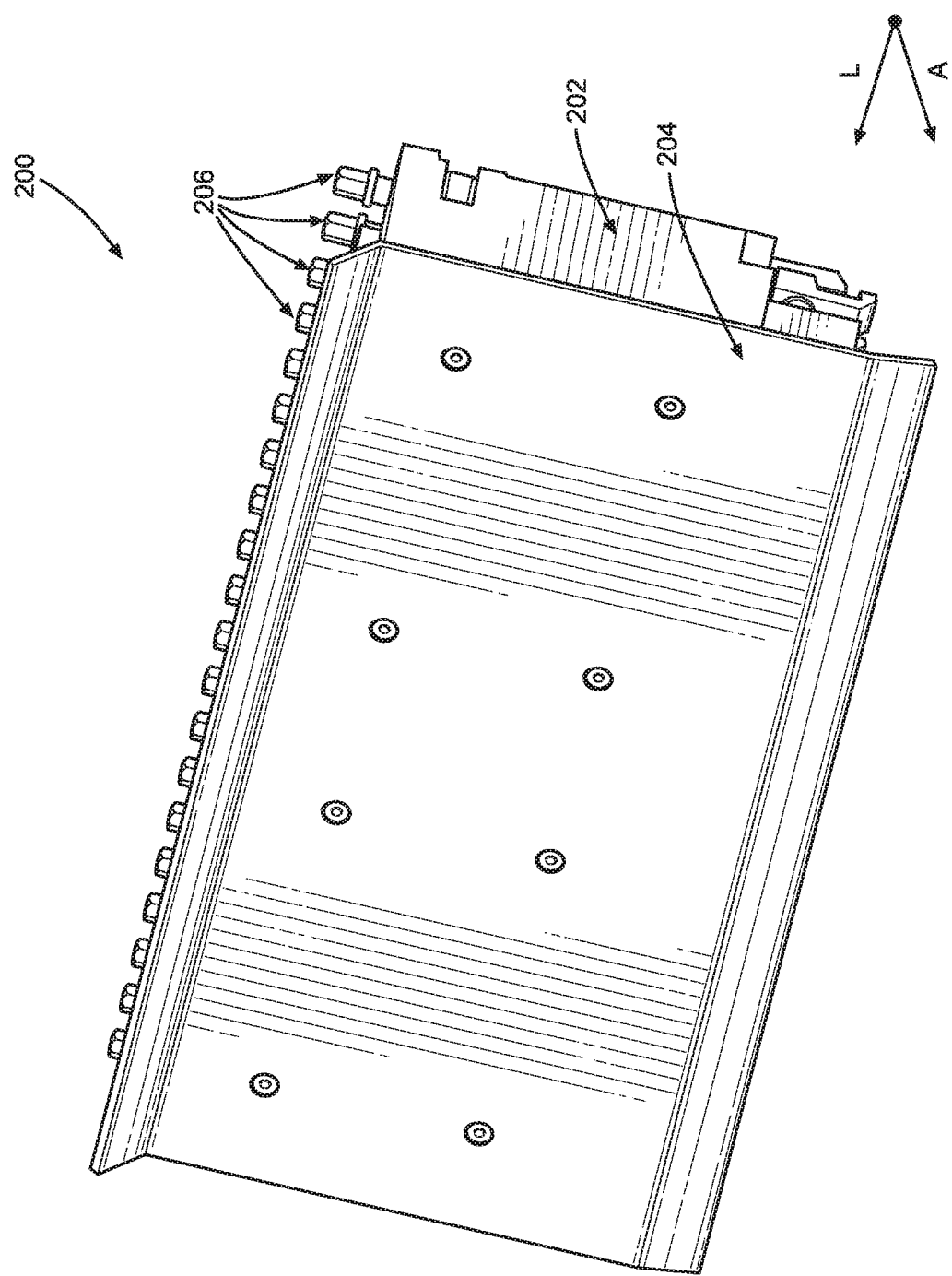
FIG. 8 illustrates a front perspective view of an adjustment system.
Figure 9:
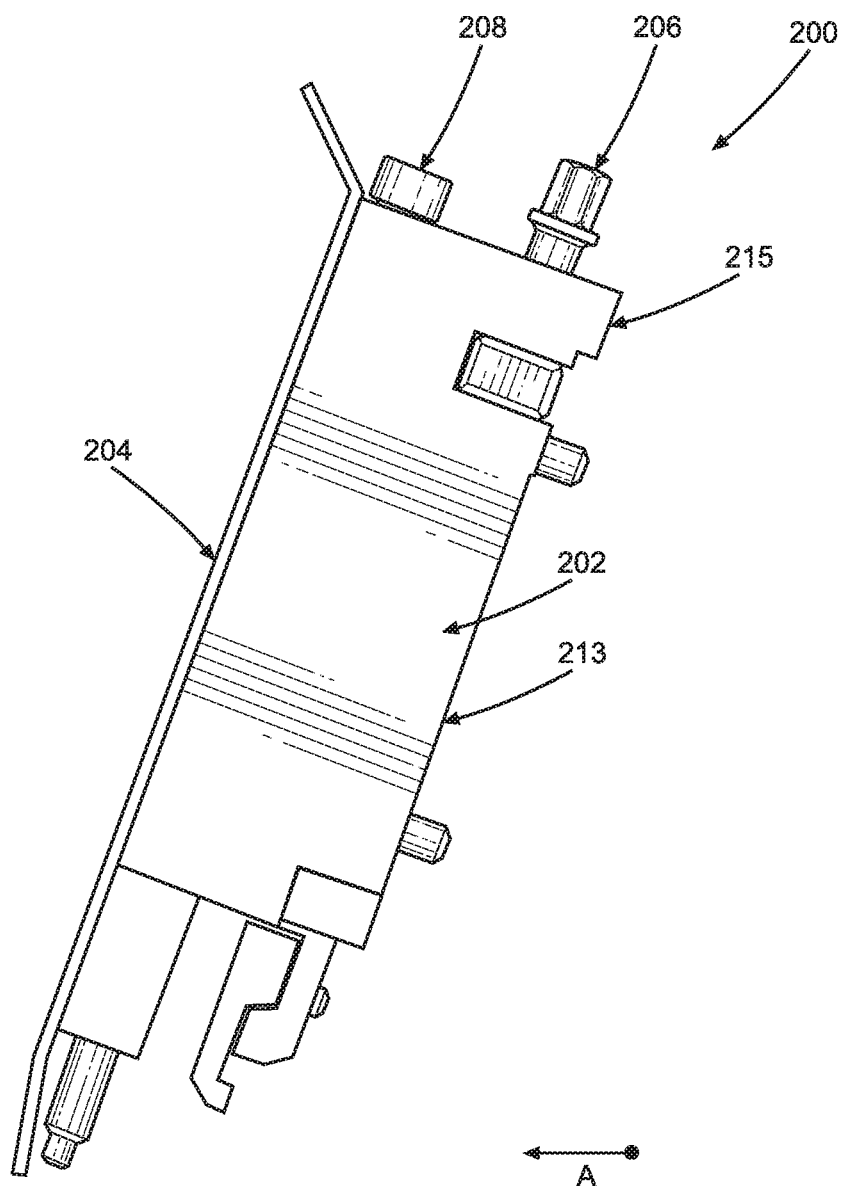
FIG. 9 illustrates a side view of the adjustment system shown in FIG. 7.
Figure 10:
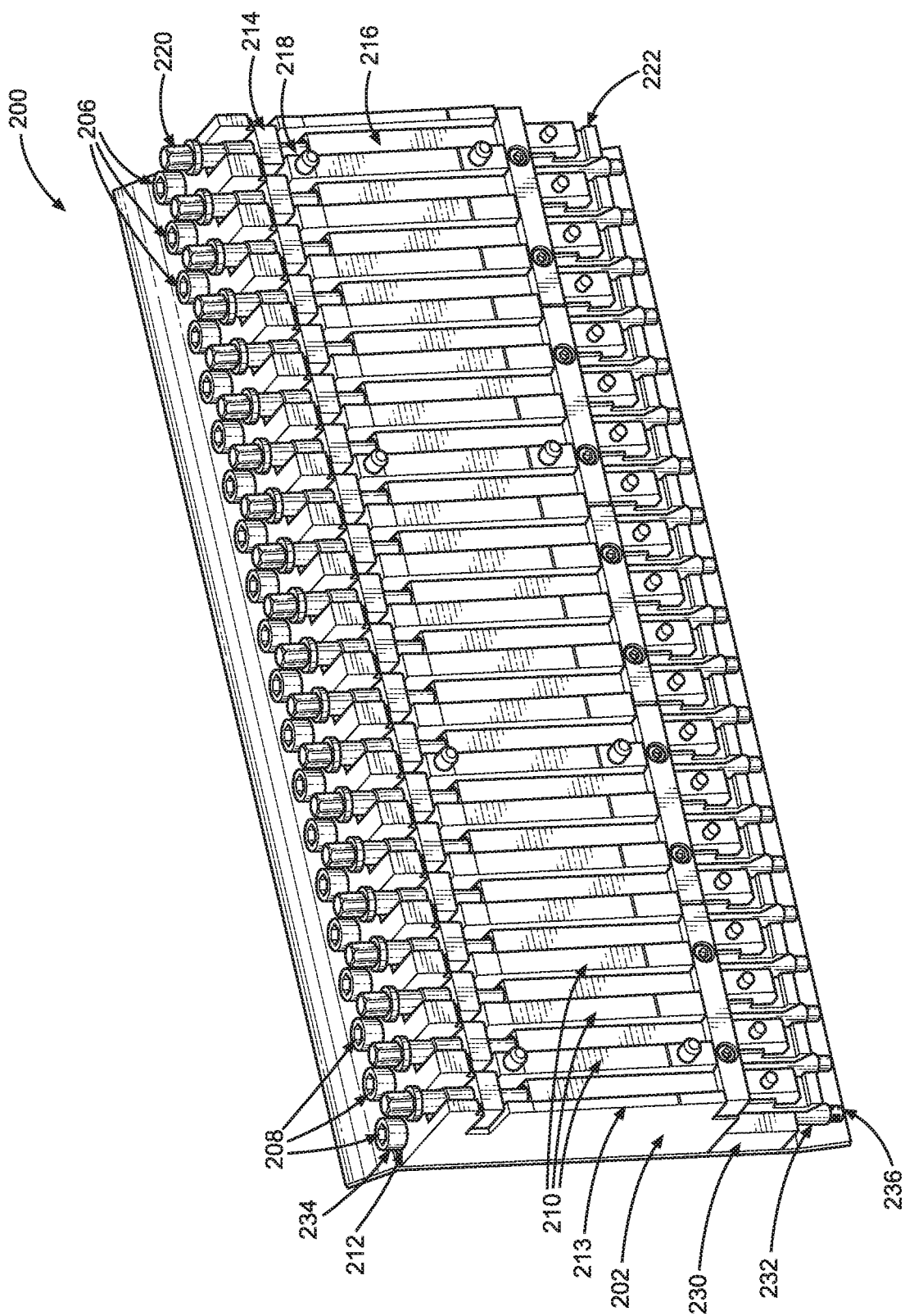
FIG. 10 illustrates a back perspective view of the adjustment system shown in FIG. 7.

FIGS. 8, 9, and 10 illustrate a top perspective view, a side view, and a bottom perspective view of the adjustment system 200. The adjustment system 200 extends in the longitudinal direction L and includes an adjustment body 202, a cover 204, a first plurality of adjusters 206, and a second plurality of adjusters 208. In an alternative aspect, instead of the adjustment system 200 including a first and a second plurality of adjusters, the adjustment system may only include the first plurality of adjusters 206. The cover 204 is removably secured to the adjustment body 202 and is configured to provide protection to the adjustment body 202 and the first and second plurality of adjusters 206 and 208.

The adjustment body 202 is configured to couple to a top of the upper body member 110. In an aspect, the adjustment body 202 comprises a single body member machined from a single piece of material. The adjustment body 202 may be secured to the upper body member 110 by, for example, bolts, screws, combinations thereof, or other commonly used fasteners. The adjustment body 202 defines a first plurality of channels 210 and a second plurality of channels 212. The first and second plurality of channels 210 and 212 extend through the adjustment body 202 from a top end to a bottom end of the adjustment body 202, such that both the first and second plurality of channels 210 and 212 open to the top end and the bottom end of the adjustment body 202. In an aspect, the first plurality of channels 210 also open to a back end 213 of the adjustment body 202. The back end 213 being configured to align with the top of the upper body member 110 when the adjustment body 202 is coupled to the upper body member 110.

The first plurality of adjusters 206 are slideably positioned within the first plurality of channels 210 defined by the adjustment body 202, such that each of the first plurality of adjusters 206 is positioned within a respective one of the first plurality of channels 210. In an aspect, each of the first plurality of adjusters 206 is aligned linearly along a length of the adjustment body 202 in the longitudinal direction L. Each of the first plurality of adjusters 206 includes a first threaded member 214, a second threaded member 216, a threaded shaft 218 positioned between the first threaded member 214 and the second threaded member 216, and a knob member 220. Each threaded shaft 218 extends from a top end of a respective second threaded member 216 through the first threaded member 214 and through a top opening of the respective one of the first plurality of channels 210. A top end of each threaded shaft 218 is coupled to a respective knob member 220. Each threaded shaft 218 is threadedly coupled to the first threaded member 214 and the second threaded member 216. It will be appreciated that each threaded shaft 218 may be formed of a single unitary member, or may include a plurality of members coupled together. For example, the threaded shaft 218 may include a bottom portion having a first threaded area and a top portion having a second threaded area. The first threaded area may threadedly couple to the first threaded member 214, and the second threaded area may threadedly couple to the second threaded member 216. The bottom portion of the threaded shaft 218 may be rotatable relative to the top portion of the threaded shaft 218.

Each of the first threaded members 214 and each of the second threaded members 216 include inner threads (not visible in the figures). The inner threads of each of the first threaded members 214 define a first pitch. The inner threads of each of the second threaded members 216 define a second pitch. In an aspect, the first pitch is different from the second pitch. The first pitch may be between approximately 4 thousandths of an inch and 12 thousandths of an inch. In an aspect, the first pitch is approximately 8 thousandths of an inch. The second pitch may be between approximately 20 thousandths of an inch and 60 thousandths of an inch. In an aspect, the second pitch is approximately 40 thousandths of an inch.

Each of the first plurality of adjusters 206 further includes a gap connector 222, located on a lower end of the adjuster 206. The gap connector 222 is configured to engage the notch 133 of the gap flange 132 of the upper body member 110. In an aspect, the gap connector 222 is configured to engage a top surface of the notch 133 and a bottom surface of the notch 133, such that movement of the gap connector 222 in an upward direction moves the notch 133 towards the upward direction, and movement of the gap connector 222 in a downward direction moves the notch 133 towards the downward direction. Movement of the notch 133 in the upward direction causes the gap flange 132 to rotate about the first flex hinge 146 in the clockwise direction (when viewed from the perspective in FIG. 3). Conversely, movement of the notch 133 in the downward direction causes the gap flange 132 to rotate about the first flex hinge 146 in the counterclockwise direction (when viewed from the perspective in FIG. 3).

Rotation of the knob member 220 causes a rotation of the threaded shaft 218. In an aspect, the knob member 220 can rotate the upper portion of the threaded shaft 218 and the lower portion of the threaded shaft 218 independently. Rotation of the upper portion of the threaded shaft 218 causes the gap connector 222 to translate in a direction substantially parallel to the respective channel of the first plurality of channels 210. The distance the gap connector 222 translates per rotation of the upper portion of the threaded shaft 218 corresponds to the first pitch of the first threaded member 214. Rotation of the lower portion of the threaded shaft 218 also causes the gap connector 222 to translate in the direction substantially parallel to the respective channel of the first plurality of channels 210. The distance the gap connector 222 translates per rotation of the lower portion of the threaded shaft 218 corresponds to the second pitch of the second threaded member 216. When the first pitch of the first thread is different from the second pitch of the second thread, an operator is able to adjust each of the first plurality of adjusters 206 with different granularities, which enables the operator to finely tune each of the first plurality of adjusters 206.

The second plurality of adjusters 208 are slideably positioned within the second plurality of channels 212 defined by the adjustment body 202, such that each of the second plurality of adjusters 208 is positioned within a respective one of the second plurality of channels 212. The second plurality of adjusters 208 may be configured substantially similarly to the first plurality of adjusters 206. Alternatively, each of the second plurality of adjusters 208 may include a single threaded member 230, a second threaded shaft 232, and a second knob member 234. Each second threaded shaft 232 extends from a bottom end 236 of the adjuster 208 through the single threaded member 230 to the second knob member 234 at an upper end of the adjuster 208. Each second threaded shaft 232 is threadedly coupled to the single threaded member 230. The single threaded members 230 includes inner threads (not visible in the figures). Rotation of the second knob member 234 causes a rotation of the second threaded shaft 232, which causes the bottom end 236 of the respective second adjuster 208 to translate in a direction substantially parallel to the respective channel of the second plurality of channels 212. The bottom end 236 of each of the second adjusters 208 is configured to contact the lip surface 131 of the lip flange 130 of the upper body member 110.

Figure 11:
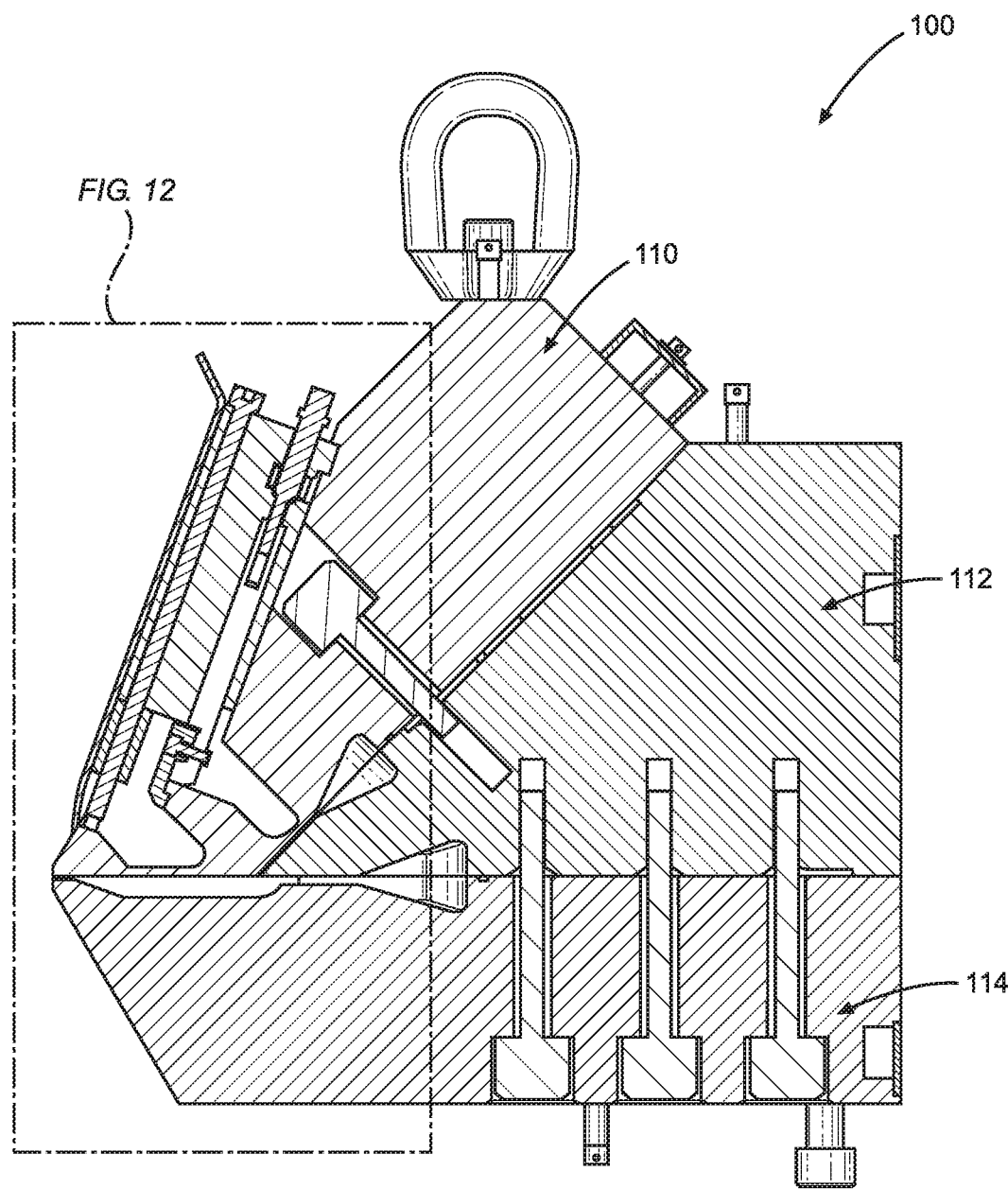
FIG. 11 illustrates a side cross sectional view of the extrusion die shown in FIG. 1 taken along line 11-11.
Figure 12:
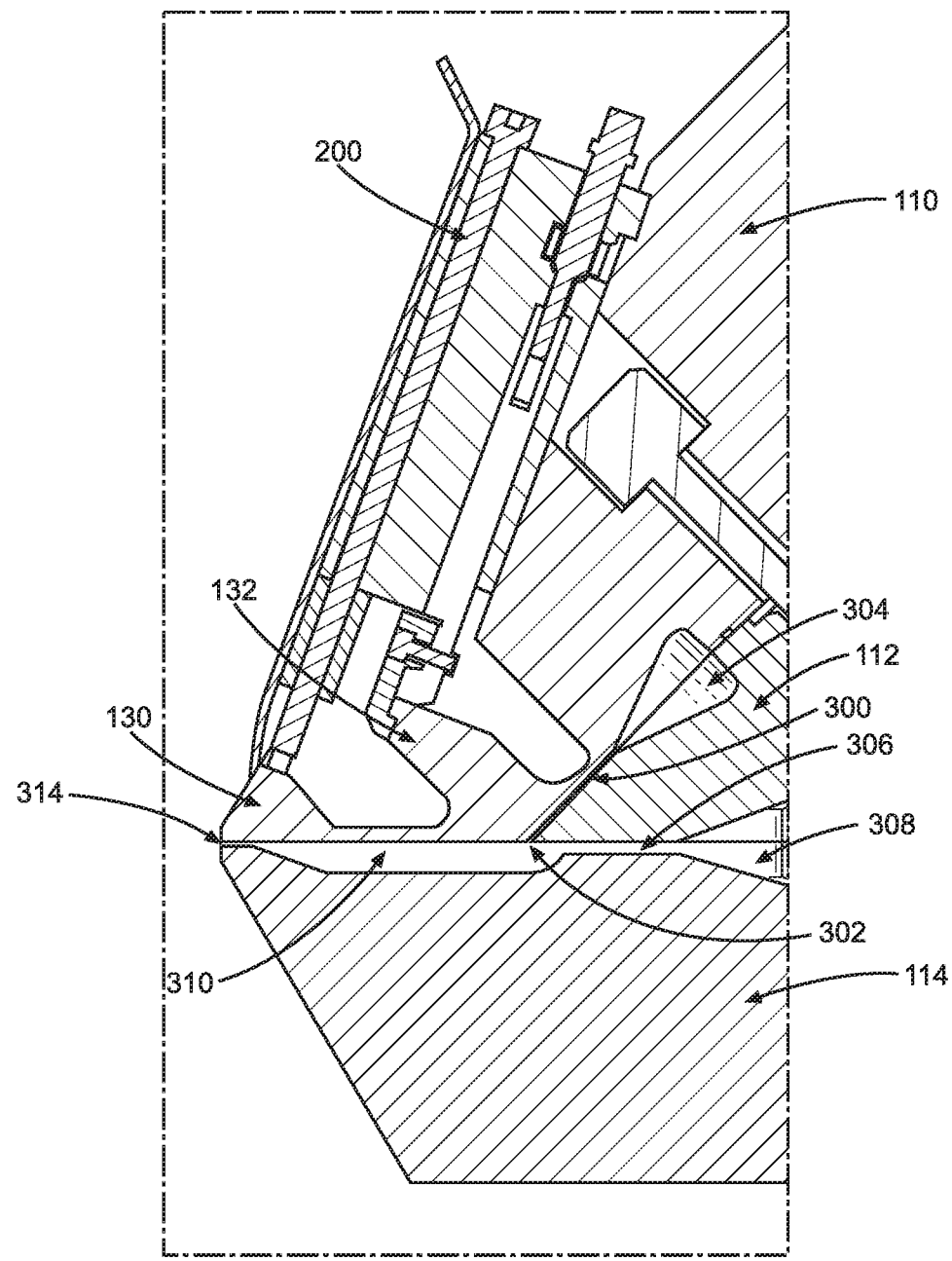
FIG. 12 illustrates a close up view of the side cross sectional view of the extrusion die shown in FIG. 11.

FIG. 11 illustrates a cross sectional side view of the extrusion die 100 taken along line 11-11 shown in FIG. 1. FIG. 12 illustrates a close up view of the cross sectional side view of the extrusion die 100 shown in FIG. 11. The center body member 112 is positioned adjacent to the upper body member 110. The gap surface 140 of the upper body member 110 confronts the upper center surface 168 of the center body member 112 forming a gap channel 300 therebetween. In an aspect, the gap surface 140 is substantially parallel to the upper center surface 168. The gap edge 141 of the upper body member 110 is adjacent to the center edge 169 of the center body member 112 defining a gap opening 302 therebetween. The upper entry channel 134 of the upper body member 110 confronts the first center channel 160 of the center body member 112 forming an upper die channel 304 therebetween.

The lower body member 114 is positioned adjacent to the upper body member 110 and the center body member 112. The lower center surface 170 of the center body member 112 confronts the first lower surface 176 of the lower body member 114 forming a first lower die channel 306 therebetween. The second center channel 164 of the center body member 112 confronts the lower entry channel 172 of the lower body member 114 forming a second lower die channel 308 therebetween. The upper die channel 304 and the second lower die channel 308 may also be referred to as a "distribution chambers" or "distribution channels." The upper surface 138 of the upper body member 110 confronts the second lower surface 178 of the lower body member 114 forming a land channel 310 (e.g. main channel) therebetween. The lower port channel 174 of the lower body member 114 confronts the second center port channel 166 of the center body member 112 forming a back end port channel (not visible in figures) that extends from a back end of the extrusion die 100 to the second lower die channel 308.

The second lower die channel 308, the first lower die channel 306, and the land channel 310 are in fluid communication with one another such that the back end 102 of the extrusion die is in fluid commutation with a die opening 314 (e.g. main opening) formed between the upper lip edge 143 of the upper body member 110 and the lower lip edge 179 of the lower body member 114 at the dispensing end 104 of the extrusion die 100. The first center port channel 162, the upper die channel 304, the gap channel 300, and the land channel 310 are in fluid communication with one another such that the side surface of the center body member 112 is in fluid communication with the die opening 314.

The adjustment system 200 is positioned adjacent to the upper body member 110, such that a protrusion 215 of the adjustment system aligns with the recess 145 of the upper body member 110. In an aspect, the adjustment system 200 and the upper body member 110 are formed as a single unitary component, such that the adjustment body 202 of the adjustment system 200 is integrally formed with the upper body member 110. The gap connectors 222 of each of the first plurality of adjusters 206 engage and are coupled to the notch 133 of the gap flange 132 of the upper body member 110. Rotation of the knob member 220 of each of the first plurality of adjusters 206 causes a rotation of the threaded shaft 218, which causes the gap connector 222 to translate, as described above. The translation of each of the gap connectors 222 causes a rotation of the gap flange 132 about the first flex hinge 146. Movement of the gap flange 132 about the first flex hinge 146 changes a size of the gap opening 302 between the upper body member 110 and the center body member 112. In an aspect, the gap connectors 222 are push-pull type connectors, such that rotation of the gap flange 132 may be controlled by the first plurality of adjusters 206 in the clockwise and counterclockwise directions about the first flex hinge 146.

The bottom end 236 of each of the second adjusters 208 contact the lip surface 131 of the lip flange 130 of the upper body member 110. Rotation of the second knob member 234 of each of the second plurality of adjusters 208 causes a rotation of the second threaded shaft 232, which causes the bottom end 236 to translate, as described above. The translation of the bottom end 236 causes a rotation of the lip flange 130 about the second flex hinge 148. Movement of the lip flange 130 about the second flex hinge 148 changes a size of the die opening 314 between the upper body member 110 and the lower body member 114. In an aspect, the connection between the bottom end 236 of the second plurality of adjusters 208 and the lip flange 130 is a push-type connection, such that rotation of the lip flange 130 may be controlled by the second plurality of adjusters 208 in the counterclockwise direction (from the perspective in FIGS. 11 and 12) about the second flex hinge 148. It will be appreciated that the resiliency of the second flex hinge 148 allows for a certain level of control of the movement of the lip flange 130 in the clockwise direction. In an alternative aspect, the connection between the bottom end 236 of the second plurality of adjusters 208 and the lip flange 130 is a push-pull type connection.

A method for using the extrusion die 100 for dispensing fluids through the die opening 314 commences by providing a first fluid to an entrance of the first center port channel 162 at the side surface of the center body member 112, and a second fluid to an entrance of the back end port channel formed between the lower body member 114 and the center body member 112. One or more extruders (not shown) may be used to feed the entrance of the port channels to deliver a precise volume of fluid into the extrusion die 100. The amount of fluid depends on a desired sheet thickness that exits the roll stack.

The second fluid flows from the back end port channel and into the land channel 310 through the first lower die channel 306 and the second lower die channel 308. The second fluid is distributed longitudinally as it enters into and fills the second lower die channel 308. As the second fluid flow exits the second lower die channel 308 in the axial direction A, a height of the second fluid (e.g. fluid height in a vertical direction) is reduced and the second fluid flows into the first lower die channel 306.

The first fluid flows from the first center port channel 162 and into the land channel 310 through the upper die channel 304 and the gap channel 300. The first fluid is distributed longitudinally as it enters into and fills the upper die channel 304. The first fluid flows through the gap opening 302 of the gap channel 300 and into the land channel 310. The size of the gap opening 302 may be adjusted by the first plurality of adjusters 206 to balance the flow distribution of the first fluid through the gap opening 302 and into the land channel 310. For example, the size of the gap opening 302 may be adjusted by rotating the knob member 220, which causes a rotation of the gap flange 132 about the first flex hinge 146. Adjusting the size of the gap opening 302 adjusts the thickness of the first fluid flowing therethrough. This method is effective in balancing the flow distribution for a variety of resin types and operation conditions (e.g. flow rate and melt processing temperature) of the first fluid (e.g. skin layer).

The first fluid is positioned on top of the second fluid in the land channel 310, and the first fluid and the second fluid flow through the land channel 310 together. After the first fluid and the second fluid flow through the land channel 310, the fluids exit out of the extrusion die 100 through the die opening 314 at the dispensing end 104 of the extrusion die 100. The flow distribution of the combined flow of the first and second fluids may be adjusted by the second plurality of adjusters 208 to balance the flow distribution of the fluids onto a roll stack. For example, flow distribution of the combined first and second fluids may be adjusted by adjusting a size of the die opening 314 by rotating the second knob member 234, which causes a rotation of the lip flange 130 about the second flex hinge 148. Rotation of the lip flange 130 adjusts the position of the upper lip edge 143 which increases and decreases the size of the die opening 314. Adjusting the size of the die opening 302 adjusts a thickness of the combined first and second fluid flowing therethrough.

These specific embodiments described above are for illustrative purposes and are not intended to limit the scope of the disclosure as otherwise described and claimed herein. Modification and variations from the described embodiments exist.

What is claimed is:

1. An adjustment system adapted for coupling to a die, the die having an upper body member, a center body member positioned adjacent to the upper body member defining a gap channel and gap opening therebetween, and a lower body member positioned adjacent to the upper body member defining a main channel and a main opening therebetween, the gap opening being positioned between the gap channel and the main channel, the adjustment system comprising:

an adjustment body defining a plurality of channels, the adjustment body being configured to couple to the upper body member; and a plurality of adjusters, each of the plurality of adjusters being slideably positioned within a respective one of the plurality of channels, each of the plurality of adjusters being configured to couple to a gap flange of the upper body member, wherein when the plurality of adjusters are coupled to the gap flange, movement of the plurality of adjusters causes a change in a size of the gap opening, wherein each of the adjusters include a knob member, at a first end, and a gap connector, at a second end, that is configured to engage a notch of the gap flange, the knob member being configured to rotate relative to the gap connector.

2. The adjustment system of claim 1, wherein the plurality of channels are a first plurality of channels, and wherein the plurality of adjusters are a first plurality of adjusters, the adjustment body further defining a second plurality of channels, and the adjustment system further comprising:

a second plurality of adjusters slideably positioned within a respective one of the second plurality of channels, each of the second plurality of adjusters being configured to couple to a lip flange of the upper body member, wherein when the second plurality of adjusters are coupled to the lip flange, movement of the second plurality of adjusters causes a change in a size of the main opening.

3. The adjustment system of claim 2, wherein the second plurality of adjusters comprise push-only adjusters.

4. The adjustment system of claim 1, wherein the plurality of adjusters comprise push-pull adjusters.

5. The adjustment system of claim 1, wherein the plurality of adjusters are aligned linearly along a length of the adjustment system.

6. The adjustment system of claim 1, further comprising:

a first plurality of threaded members, each of the first plurality of threaded members being coupled to a respective one of the plurality of adjusters, each of the first plurality of threaded members comprising a first pitch; and a second plurality of threaded members, each of the second plurality of threaded members being coupled to a respective one of the plurality of adjusters, each of the second plurality of threaded members comprising a second pitch, wherein the first pitch is different from the second pitch.

7. The adjustment system of claim 1, wherein the adjustment body comprises a single body member.

8. A die, comprising:

an upper body member having an upper surface, a gap surface, a gap edge positioned between the upper surface and the gap surface, and a gap flange, an upper lip edge spaced from the gap edge in a direction, and a lip flange that is spaced from the gap flange in the direction, wherein the upper surface extends along the direction away from the gap edge to the upper lip edge; and an adjustment system comprising:

an adjustment body defining a first plurality of channels and a second plurality of channels, a first plurality of adjusters, each of the first plurality of adjusters being slideably positioned within a respective one of the first plurality of channels, each of the first plurality of adjusters being configured to couple to the gap flange of the upper body member, wherein when the first plurality of adjusters are coupled to the gap flange, movement of the first plurality of adjusters causes a change in a position of the gap edge, and
a second plurality of adjusters, each of the second plurality of adjusters being slideably positioned within a respective one of the second plurality of channels, each of the second plurality of adjusters being configured to couple to the lip flange of the upper body member, wherein when the second plurality of adjusters are coupled to the lip flange, movement of the second plurality of adjusters causes a change in a position of the upper lip edge.

9. The die of claim 8, wherein the upper body member and the adjustment system are integrally formed together.

10. The die of claim 8, wherein the upper surface extends in the direction beyond the gap flange.

11. The die of claim 8, wherein the lip flange is connected to the gap flange by a lip flex hinge that extends away from the gap flange in the direction, whereby when the second plurality of adjusters are coupled to the lip flange, movement of the second plurality of adjusters causes the lip flange to move about the lip flex hinge thereby causing flexing of the lip flex hinge.

12. The die of claim 8, wherein the upper body member has a gap flex hinge, the gap flange is configured to move about the gap flex hinge, and when the first plurality of adjusters are coupled to the gap flange, movement of the first plurality of adjusters causes the gap flange to move about the gap flex hinge thereby causing flexing of the gap flex hinge.

13. A die, comprising:
an upper body member having an upper surface, a gap surface, a gap edge positioned between the upper surface and the gap surface, and a gap flange; and
an adjustment system comprising:
an adjustment body defining a plurality of channels, and
a plurality of adjusters, each of the plurality of adjusters being slideably positioned within a respective one of the plurality of channels, each of the plurality of adjusters being configured to couple to the gap flange of the upper body member, wherein when the plurality of adjusters are coupled to the gap flange, movement of the plurality of adjusters causes a change in a position of the gap edge,
wherein the upper body member includes an adjustment portion and an attachment portion connected to the adjustment portion by a flex hinge, the adjustment portion comprising the gap flange, wherein when the plurality of adjusters are coupled to the gap flange, movement of the plurality of adjusters causes the adjustment portion to rotate relative to the attachment portion about the flex hinge.

14. The die of claim 13, further comprising:
a center body member having an upper center surface, a lower center surface, and a center edge positioned between the upper center surface and the lower center surface, the center member being positioned adjacent to the upper body member defining a gap channel between the gap surface and the upper center surface and a gap opening between the gap edge and the center edge,
wherein when the plurality of adjusters are coupled to the gap flange, movement of the plurality of adjusters causes a change in a size of the gap opening.

15. The die of claim 14, wherein the upper surface of the upper member defines an upper edge, the die further comprising:
a lower body member having a lower surface defining a lower edge, the lower body member positioned adjacent to the upper body member defining a main channel between the lower surface of the lower body member and the upper surface of the upper member and a main opening between the lower edge of the lower body member and the upper edge of the upper member,
wherein the gap opening is positioned between the gap channel and the main channel.

16. The die of claim 15, wherein the plurality of channels are a first plurality of channels, and wherein the plurality of adjusters are a first plurality of adjusters, the adjustment body further defining a second plurality of channels,
the upper body member comprising:
a lip flange, the lip flange and the gap flange composing the adjustment portion, and
the adjustment system further comprising:
a second plurality of adjusters slideably positioned within a respective one of the second plurality of channels, each of the second plurality of adjusters being configured to couple to the lip flange of the upper body member, wherein when the second plurality of adjusters are coupled to the lip flange, movement of the second plurality of adjusters causes a change in a size of the main opening.

17. The die of claim 16, wherein the first plurality of adjusters comprise push-pull adjusters, and wherein the second plurality of adjusters comprise push-only adjusters.

18. The die of claim 16, further comprising:
a first plurality of threaded tuning members, each of the first plurality of threaded tuning members being coupled to a respective one of the first plurality of adjusters, each of the first plurality of threaded tuning members comprising a first pitch; and
a second plurality of threaded tuning members, each of the second plurality of threaded tuning members being coupled to a respective one of the first plurality of adjusters, each of the second plurality of threaded tuning members comprising a second pitch,
wherein the first pitch is different from the second pitch.

19. A die, comprising:
an upper body member having an upper surface, a gap surface, a gap edge positioned between the upper surface and the gap surface, a flex hinge, and a gap flange configured to move about the flex hinge;
a center body member having an upper center surface, a lower center surface, and a center edge positioned between the upper center surface and the lower center surface, the center member being positioned adjacent to the upper body member defining a gap channel between the gap surface and the upper center surface and a gap opening between the gap edge and the center edge; and
an adjustment system comprising:
an adjustment body defining a plurality of adjuster channels, and
a plurality of gap adjusters, each of the plurality of gap adjusters being slideably positioned within a respective one of the plurality of adjuster channels, each of the plurality of gap adjusters being configured to couple to the gap flange of the upper body member, wherein when the plurality of gap adjusters are coupled to the gap flange, movement of the plurality of gap adjusters causes the gap flange to move about the flex hinge thereby causing flexing of the flex hinge and a change in a size of the gap opening.

20. The die of claim 19, wherein the upper surface of the upper member defines an upper edge, the die further comprising:
- a lower body member having a lower surface defining a lower edge, the lower body member positioned adjacent to the upper body member defining a main channel between the lower surface of the lower body member and the upper surface of the upper member and a main opening between the lower edge of the lower body member and the upper edge of the upper member,
- wherein the gap opening is positioned between the gap channel and the main channel.

21. The die of claim 20, wherein the adjustment body further defines a plurality of lip channels,
- the upper body member comprising:
  - a lip flange, and
- the adjustment system further comprising:
  - a plurality of lip adjusters slideably positioned within a respective one of the plurality of lip channels, each of the plurality of lip adjusters being configured to couple to the lip flange of the upper body member, wherein when the plurality of lip adjusters are coupled to the lip flange, movement of the plurality of lip adjusters causes a change in a size of the main opening.

22. The die of claim 21, wherein the center body member is a first center member, and wherein the adjustment system is a first adjustment system, and wherein the lower member has a second gap surface, a second gap edge positioned between the second gap surface and the lower surface, and a second gap flange, the die further comprising:
- a second center body member having a second upper center surface, a second lower center surface, and a second center edge positioned between the second upper center surface and the second lower center surface, the second center body member being positioned adjacent to the lower body member defining a second gap channel between the second gap surface and the second lower center surface and a second gap opening between the second gap edge and the second center edge; and
- a second adjustment system comprising:
  - a second adjustment body defining a second plurality of gap channels, and
  - a second plurality of gap adjusters, each of the second plurality of gap adjusters being slideably positioned within a respective one of the second plurality of gap channels, each of the second plurality of gap adjusters being configured to couple to the second gap flange of the lower body member, wherein when the second plurality of gap adjusters are coupled to the second gap flange, movement of the second plurality of gap adjusters causes a change in a size of the second gap opening.

23. A method for dispensing fluid through an extrusion die, the extrusion die defining a gap channel, a gap opening, a main channel, a main opening, and a lower channel, the gap opening being positioned between the main channel and the gap channel, the method comprising:
- providing a first fluid into the main channel through the gap opening via the gap channel;
- providing a second fluid into the main channel via the lower channel such that the first fluid is combined with the second fluid in the main channel; and
- adjusting a thickness of the first fluid flowing through the gap opening by moving a plurality of adjusters to cause a gap flange of the extrusion die to move about a flex hinge of the extrusion die, thereby causing flexing of the flex hinge and a change in a size of the gap opening.

24. The method of claim 23, wherein the extrusion die includes a gap flange and an adjustment system having the plurality of adjusters coupled to the gap flange,
- wherein adjusting a thickness of the first fluid flowing through the gap opening comprises:
  - adjusting at least one of the plurality of adjusters coupled to the gap flange such that movement of the at least one of the plurality of adjusters causes a change in the size of the gap opening.

25. The method of claim 24, further comprising:
- dispensing the combined first and second fluid through the main opening; and
- adjusting a thickness of the combined first and second fluid dispensed through the main opening by adjusting a size of the main opening.

26. The method of claim 25, wherein the extrusion die includes a lip flange, wherein the plurality of adjusters is a first plurality of adjusters, and wherein the adjustment system further includes a second plurality of adjusters coupled to the lip flange,
- wherein adjusting the thickness of the combined first and second fluid through the main opening comprises:
  - adjusting at least one of the second plurality of adjusters coupled to the lip flange such that movement of the at least one of the second plurality of adjusters causes a change in the size of the main opening.

* * * * *